United States Patent
LeBlanc

(10) Patent No.: US 9,846,259 B2
(45) Date of Patent: Dec. 19, 2017

(54) APPARATUS AND METHODS OF MULTIPLEXING TRANSMISSIVE OPTICAL SENSORS

(71) Applicant: Halliburton Energy Services, Inc., Houston, TX (US)

(72) Inventor: Michel Joseph LeBlanc, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 114 days.

(21) Appl. No.: 15/022,437

(22) PCT Filed: Nov. 14, 2013

(86) PCT No.: PCT/US2013/070051
§ 371 (c)(1),
(2) Date: Mar. 16, 2016

(87) PCT Pub. No.: WO2015/073000
PCT Pub. Date: May 21, 2015

(65) Prior Publication Data
US 2016/0223711 A1  Aug. 4, 2016

(51) Int. Cl.
*G01B 9/02* (2006.01)
*G01V 8/24* (2006.01)
(Continued)

(52) U.S. Cl.
CPC ............ *G01V 8/24* (2013.01); *E21B 47/102* (2013.01); *E21B 47/123* (2013.01); *G01H 9/004* (2013.01)

(58) Field of Classification Search
CPC ....... G01V 8/24; E21B 47/102; E21B 47/123; G01H 9/004; G01D 5/35306;
(Continued)

(56) References Cited

U.S. PATENT DOCUMENTS 6,529,276 B1  3/2003  Myrick
7,046,349 B2 *  5/2006  Everall ............. G01D 5/35383
356/73.1
(Continued)

FOREIGN PATENT DOCUMENTS

CN  101777727 A  7/2010
CN  102853858 A  1/2013
(Continued)

OTHER PUBLICATIONS

Stubkjaer, Semiconductor Optical Amplifier-Based All-optical Gates for High-Speed Optical Processing, IEEE Journal on Selected Topics in Quantum Electronics, vol. 6, No. 6, Nov./Dec. 2000.*
(Continued)

*Primary Examiner* — Tarifur Chowdhury
*Assistant Examiner* — Jonathon Cook
(74) *Attorney, Agent, or Firm* — Chamberlain Hrdlicka

(57) ABSTRACT

Various embodiments include apparatus and methods structured to interrogate a plurality of sensor assemblies, where each sensor assembly may have one or more transmissive optical sensors. The plurality of sensor assemblies can be arranged to couple between two optical fibers. The interrogation can include generating optical signals to each sensor assembly such that each sensor assembly can be selectively and individually interrogated using semiconductor optical amplifiers. Additional apparatus, systems, and methods are disclosed.

29 Claims, 7 Drawing Sheets

(51) Int. Cl.
*E21B 47/10* (2012.01)
*E21B 47/12* (2012.01)
*G01H 9/00* (2006.01)

(58) Field of Classification Search
CPC ........... G01D 5/35309; G01D 5/35312; G01D 5/35316; G01D 5/35383; G01D 5/3539; G01L 1/246; G01B 9/02023; G01B 11/161
USPC ......................................................... 356/478
See application file for complete search history.

(56) References Cited

U.S. PATENT DOCUMENTS

| | | |
|---|---|---|
| 7,095,551 B2 | 8/2006 | Seo et al. |
| 8,525,995 B2 | 9/2013 | Jones et al. |
| 2003/0058500 A1 | 3/2003 | Sugawara |
| 2009/0202237 A1 | 8/2009 | Zhang et al. |

FOREIGN PATENT DOCUMENTS

| | | |
|---|---|---|
| KR | 100579512 B1 | 5/2006 |
| WO | WO-2015073000 A1 | 5/2015 |

OTHER PUBLICATIONS

"International Application Serial No. PCT/US2013/070051, International Search Report dated Aug. 11, 2014", 3 pgs.

"International Application Serial No. PCT/US2013/070051, Written Opinion mailed Aug. 11, 2014", 10 pgs.

Lloyd, Glynn, et al., "A high-performance miniaturized time division multiplexed sensor system for remote structural health monitoring", *Proceedings of SPIE vol. 5459—Optical Sensing*, (2004), 145-156.

* cited by examiner

APPARATUS AND METHODS OF MULTIPLEXING TRANSMISSIVE OPTICAL SENSORS

PRIORITY APPLICATIONS

This application is a U.S. National Stage Filing under 35 U.S.C. 371 from International Application No. PCT/US2013/070051, filed on 14 Nov. 2013, and published as WO 2015/073000 A1 on 21 May 2015 which application and publication are incorporated herein by reference in their entirety.

TECHNICAL FIELD

The present invention relates generally to apparatus for making measurements.

BACKGROUND

In drilling wells for oil and gas exploration, understanding the structure and properties of the associated geological formation provides information to aid such exploration. It is important to monitor the physical conditions inside the wellbore of an oil well, in order to ensure proper operation of the well. Dynamic wellbore conditions to be monitored during production can include, but are not limited to, pressure, temperature, and strain. Fiber optic sensors are attractive sensors for harsh environment applications due to their distinguished characteristics including good high-temperature capability, corrosion resistance, and electromagnetic insensitivity. There is ongoing effort to develop systems and methods that can allow for more flexibility without significant loss of precision in systems and techniques to measure parameters downhole at a drilling site.

DETAILED DESCRIPTION

Figure 1:
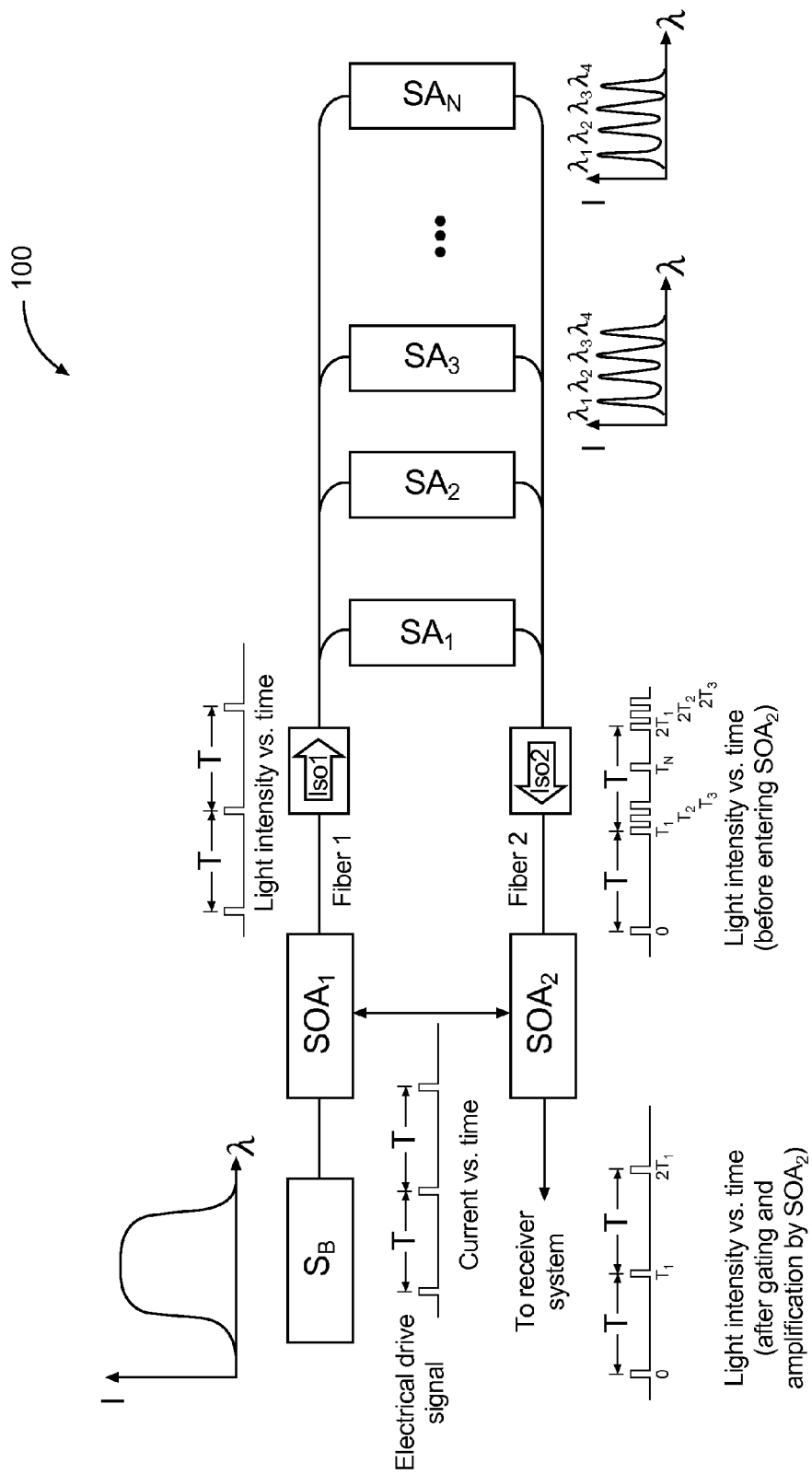
FIG. 1 shows a representation of an example combined time-division multiplexed and wavelength-division multiplexed system, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Semiconductor optical amplifier (SOAs) are devices that amplify optical signals using the principle of stimulated light emission (StE). An SOA can be viewed as essentially being a semiconductor laser minus the reflective facets. When a current is fed to the SOA, some light is emitted by spontaneous emission (SpE), such as for a light emitting diode (LED), but also a condition of population inversion is created within the device so that it can amplify light. Some of the SpE light is amplified by the device, but this light is broadband, passes only once within the device, and, in the absence of reflective facets, it does not obtain a high degree of coherence. However, because of the population inversion, light coupled into one end of the device, if also within the gain bandwidth of the SOA, will stimulate the emission of the light (StE) by the SOA, which is the main purpose of such a device. When no current is fed to the SOA, the device does not emit light on its own and, furthermore, absorbs light that traverses it. Because of this, the SOA can be used as a modulator to gate, on and off, the light that passes through the device, accompanied by the amplification of the signal that it allows to pass through when switched on. Furthermore, the SOA is bi-directional, meaning that it amplifies light that traverses in either direction. A major application of an SOA is for the in-line amplification of light brought to it via fibers coupled to the device, typically one on each side of the device. Communication examples of such uses include operating the SOAs as boosters (amplifying light directly coming from a transmitter before launching it into an optical fiber link) or as pre-amplifiers placed in front of a receiver to optically amplify light before it hits the detector.

The operational behaviors of the SOA device have been used to serve as a method to interrogate several reflective sensors placed in series along a fiber link. The reflective sensors have been structured as fiber Bragg gratings with Bragg wavelengths falling within the gain bandwidth of the SOA. The approach using the reflective sensors is based on the pulsing of the SOA at a temporarily fixed rate with the rate set just so that the time between two pulses is exactly the time that is needed for the light to reach a particular sensor and return to the SOA. While the SOA is maintained at that rate, only the light reflected from this particular sensor is amplified in the receive direction by the SOA and can be processed further by the detector. To interrogate another sensor, such as one farther away from the SOA, the pulse rate is changed, in this case decreased, so that the condition of synchronicity between launch and arrival pulses now corresponds to this other sensor.

In various embodiments, two SOAs can be arranged for the interrogation of transmissive sensors in arrangements taught herein. FIG. 1 illustrates a representation of an embodiment of an example of combined time-division multiplexed (TDM) and wavelength-division multiplexed (WDM) system 100. The combined system 100 can be based on the use of two SOAs to interrogate individual sensor assemblies ($SA_1$ to $SA_N$) by TDM, where one or more of $SA_1 \ldots SA_N$ can consist of a number of sensors separated in the wavelength domain, providing a WDM arrangement.

The system 100 may be structured without a WDM arrangement. Each sensor assembly is connected to Fiber 1 and Fiber 2 via optical tap couplers so that each only sensor assembly receives part of the light propagating along Fiber 1 and gets its output combined to Fiber 2.

$SOA_1$ and $SOA_2$ can be connected to the same electrical pulse source so that they are switched on and off at the same time. Light source $S_B$ can be broadband and can have a spectrum that overlaps that of the gain spectrum of the two SOAs. The light source $S_B$ can include, but is not limited to, a superluminescent edge-emitting diode (SLED). The electrical pulse signal, as shown in FIG. 1, can be provided as current pulses over time. Let T be the time between the pulses, each pulse of duration much smaller than T. The output of $SOA_1$ outputs light intensity over time with the same time between pulses as the drive current. Fiber 1 is coupled to $SOA_1$ and is used for propagating light from $SOA_1$ to the sensors. Fiber 2 is coupled to $SOA_2$ and is used for propagating light from the sensors to $SOA_2$. Fiber 1 and Fiber 2 may be structured as two fiber segments of a common fiber. The two isolators (Iso1 and Iso2) are not necessary, but improve the performance of the system. Let $T_1$ be the total travel time needed for a pulse to leave $SOA_1$, go through $SA_1$, and return to $SOA_2$ via fiber 2. Let $T_2$ be the total travel time needed for a pulse to leave $SOA_1$, go through $SA_2$, and return to $SOA_2$. Similarly, $T_3$, $T_4$, $T_5$, etc. can be defined in relation to $SA_3$, $SA_4$, $SA_5$, etc., up to $SA_N$ where N is the reference number of the furthest sensor assembly on the line. Each location of each SA can consist of more than one sensor that can be distinguished in the wavelength domain, as long as each sensor is within the gain bandwidth of both $SOA_1$ and $SOA_2$. Though FIG. 1 illustrates four wavelengths for each $SA_1 \ldots SA_N$, each of these SAs can have sensors with more or less than four wavelengths that can be distinguished in the wavelength domain. In addition, the number of sensors and the number of sensors that can be distinguished in the wavelength domain in each SA can vary among the $SA_1 \ldots SA_N$.

The electrical pulse train that drives $SOA_1$ and $SOA_2$ can be produced by a controllable pulse source so that T can be adjusted as desired. The lengths of the fibers are configured such that $T_N > T_{N-1} \ldots > T_3 > T_2 > T_1$ (as shown in the layout of FIG. 1) and, critically, also such that $T_N < 2T_1$. This time relationship is shown in the representation of light intensity versus time before entering $SOA_2$. FIG. 1 also shows light intensity versus time after gating and amplification by $SOA_2$. Selection of time periods in the above manner can be made to ensure that the pulses from each sensor arrive at $SOA_2$, and are blocked except for the target sensor, prior to the launch of the second pulse, which will also open $SOA_2$ for transmission to the receiver system.

Consequently, by adjusting T so that $T=T_1$, only light traversing $SA_1$ is amplified by $SOA_2$. This light is combined with the spontaneous emission of $SOA_2$ but this SpE light has no sensing information, and, furthermore, its spectral content can be taken into account (normalized out) in the signal processing. The SpE light of $SOA_2$ does, however, reduce signal-to-noise ratio. Interrogation of $SA_2$ is obtained by setting $T=T_2$, etc. In other words, the SAs are interrogated by TDM. With the electrical drive signal being fed simultaneously to $SOA_1$ and $SOA_2$, $SOA_1$ and $SOA_2$ are on and off at the same times. By appropriately selecting the value of T with respect to the time of travel to go from $SOA_1$ and $SOA_2$, light that propagates through SAs that do not travel from $SOA_1$ and $SOA_2$ in integral multiples of T are effectively turned off by $SOA_2$, that is, do not pass through $SOA_2$.

Each SA has a value of T that is different from the value of T for the other SAs in the line. The selection of the set of values of T for the SAs can be determined in a calibration process. The calibration process may include slowly increasing T until a signal is received from the output of $SOA_2$, which is the time for the first $SA_1$ in the line. The value of T is increased slowly from this first time, where there is no output from the $SOA_2$ until the time for a signal from the second $SA_2$ to reach $SOA_2$ when $SOA_2$ is on. This value of T is taken to be the value for the second $SA_2$. The value of T is further increased slowly until there is a T value determined for all the SAs. Other calibration procedures can be used.

Figure 2:
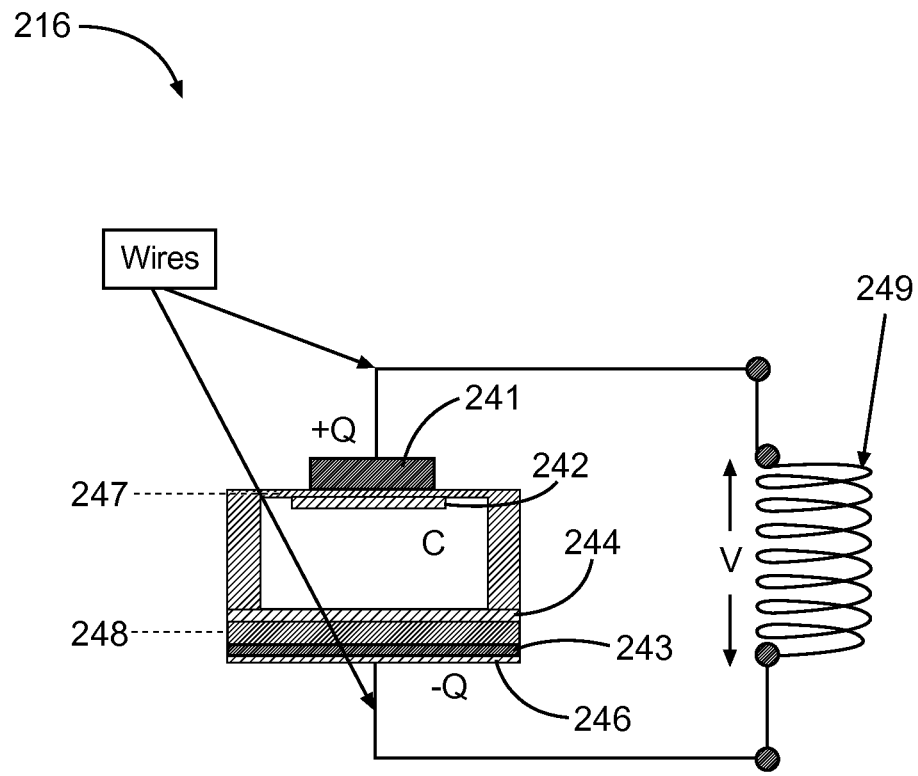
FIG. 2 shows a type of sensor that may be employed for use in fiber optic sensing systems, in accordance with various embodiments.
Figure 2:
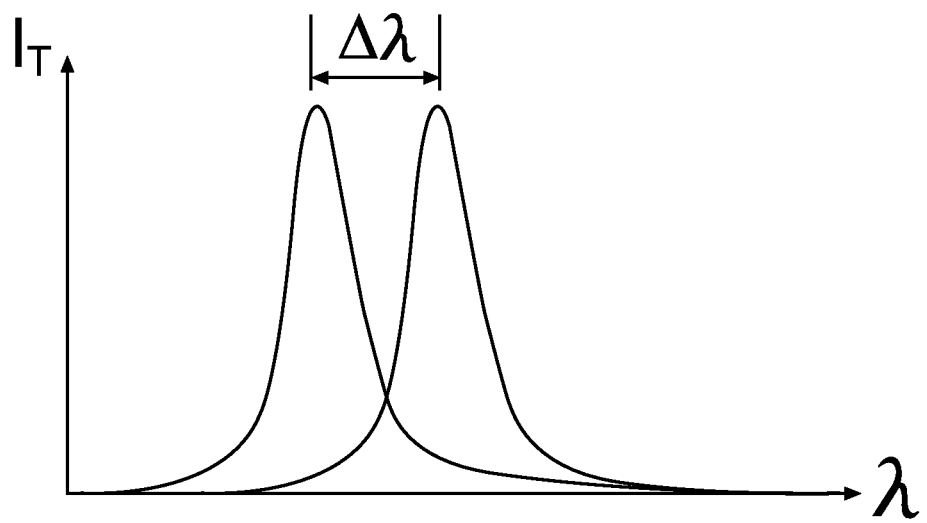

FIG. 2 shows a type of sensor 216 that may be employed for use in fiber optic systems similar to or identical to systems discussed herein, including the system 100 of FIG. 1. Other types of sensors may be used. The sensor 216 can be structured as a MEMS-based Fabry-Perot sensor that can detect varying magnetic fields. Optical coating 242 can be disposed on flexible mirror structure 247 and optical coating 244 can be disposed on surface 248. The two of optical coatings 242 and 244 are surfaces that create a Fabry-Perot cavity. The lowest surface 246 disposed on electrode 243 is an anti-reflection coating to make the response of the sensor 216 sensitive only to the inner surfaces of the device. The sensor response is encoded in the wavelength of the light. A time varying magnetic field associated with coil 249 can induce a voltage, V, which is a potential difference provided between electrodes 241 and 243 of a two plate capacitor. C is the capacitance of the two plate capacitor and Q is the charge accumulation in the plates of the capacitor. As shown in FIG. 2, the transmission spectrum of the device varies in time in relation to the detected magnetic field. Other sensors that are compatible with an approach as shown in FIG. 1, for example, include long-period Bragg gratings and extrinsic Fabry Perot interferometers (EFPI). The technique may also be used to multiplex integrated computational elements (ICE technology) sensors. This approach is described in U.S. Pat. Nos. 6,529,276B1 and 8,525,995B2. In this context, each of the ICE devices can be configured as a transmissive filter elements interrogated similarly to the other transmissive elements mentioned in this paragraph.

Processing of the sensor light in the part of the optical system beyond $SOA_2$ can occur as would be done in a single-sensor system, because while T is maintained to one particular value, the system operates as if a single sensor was illuminated, with the only difference being that the light arrives in pulses. Sample and hold circuitry, as well as electronic signal filtering (analog or digital) can be used to deal with the pulsed nature of the signal and make appear as the signal would appear if a continuous optical signal was applied to a single sensor. The frequency $f=1/T$ is set above twice the highest frequency of interest in the measurement. For example, a Mach-Zehnder (MZ) interferometer can be used on the received end for converting the variations in wavelength of the sensor transmission spectrum into an interferometric signal. As a note, because the final optical signal is the product of the transfer function of all the components between source and detector, the MZ interferometer could also be placed on the source side of the system (e.g., between the SB and $SOA_1$) without changing the end result. However, such configuration is less intuitive and typically makes it more difficult to adjust the operational parameters of the system, because measurements at the output of the individual subsystems are less useful.

Figure 3:
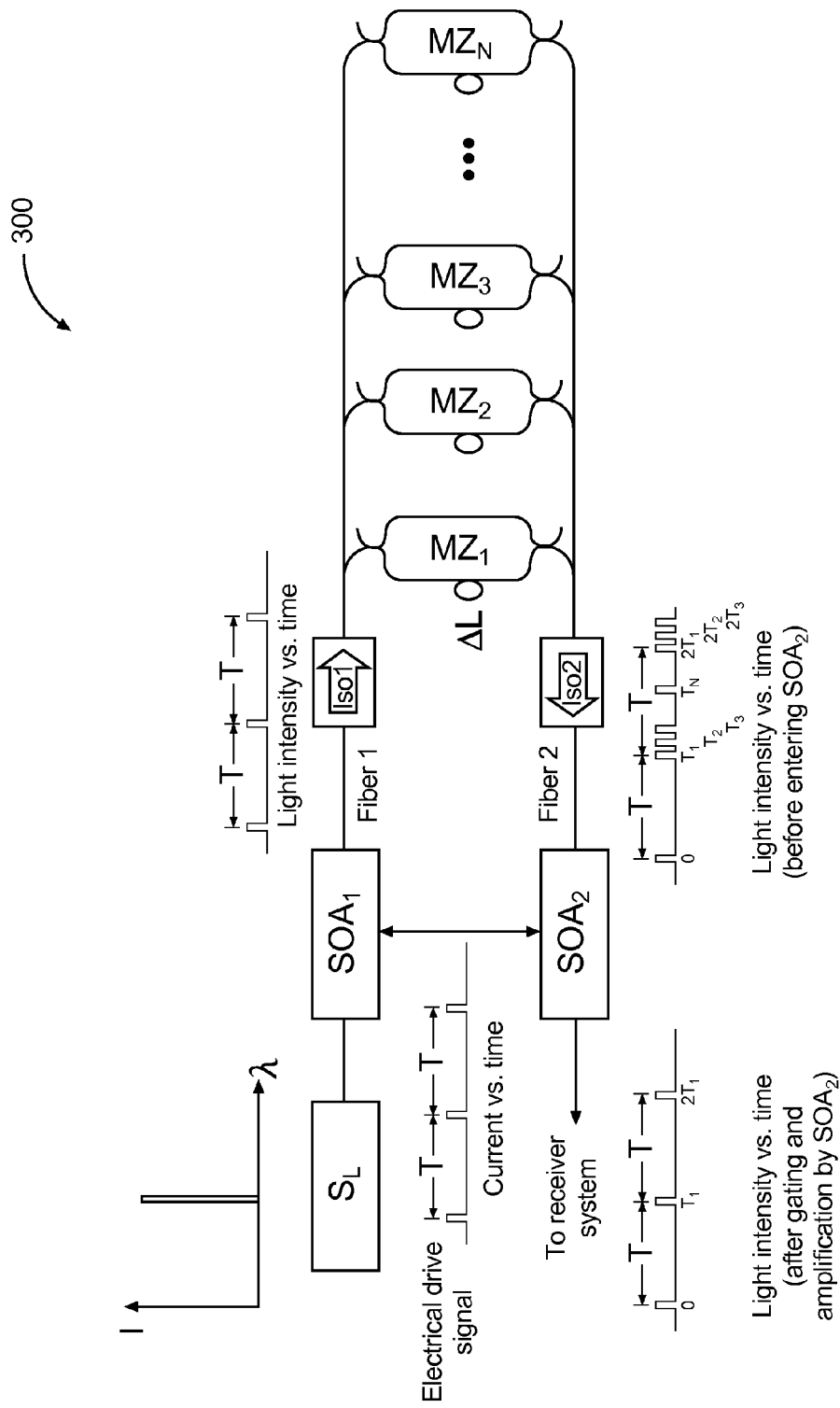
FIG. 3 shows an example system multiplexing several Mach-Zehnder interferometers, in accordance with various embodiments.

FIG. 3 shows an embodiment of an example system 300 multiplexing several Mach-Zehnder interferometers. This arrangement of two SOAs, used to create light pulses at the light launch end and to gate light pulses on the receiver side, provides a variation of the approach above. In this case, the light source $S_L$ placed in front of $SOA_1$ has a narrow linewidth instead of being broadband. The light source $S_L$ can be, but is not limited to, a semiconductor laser. Turning on $SOA_1$ amplifies the light from the light source $S_L$, where the light pulses consist of coherent light. The sensor assemblies are, in this case, Mach-Zehnder interferometers ($MZ_1$, $MZ_2 \ldots MZ_N$). Optical processing on the non-sensor sides of $SOA_1$ and $SOA_2$ can combine all the usual optical and electronic components consistent with the interrogation of a single MZ interferometer, with the only difference being that the light is not continuous wave (CW), but rather consists of a pulse train. As mentioned above, by use of sample-and-hold and filtering, it is possible to make the pulse nature of the signal disappear so this is not expected to be a difficulty in the use of this approach.

Figure 4:
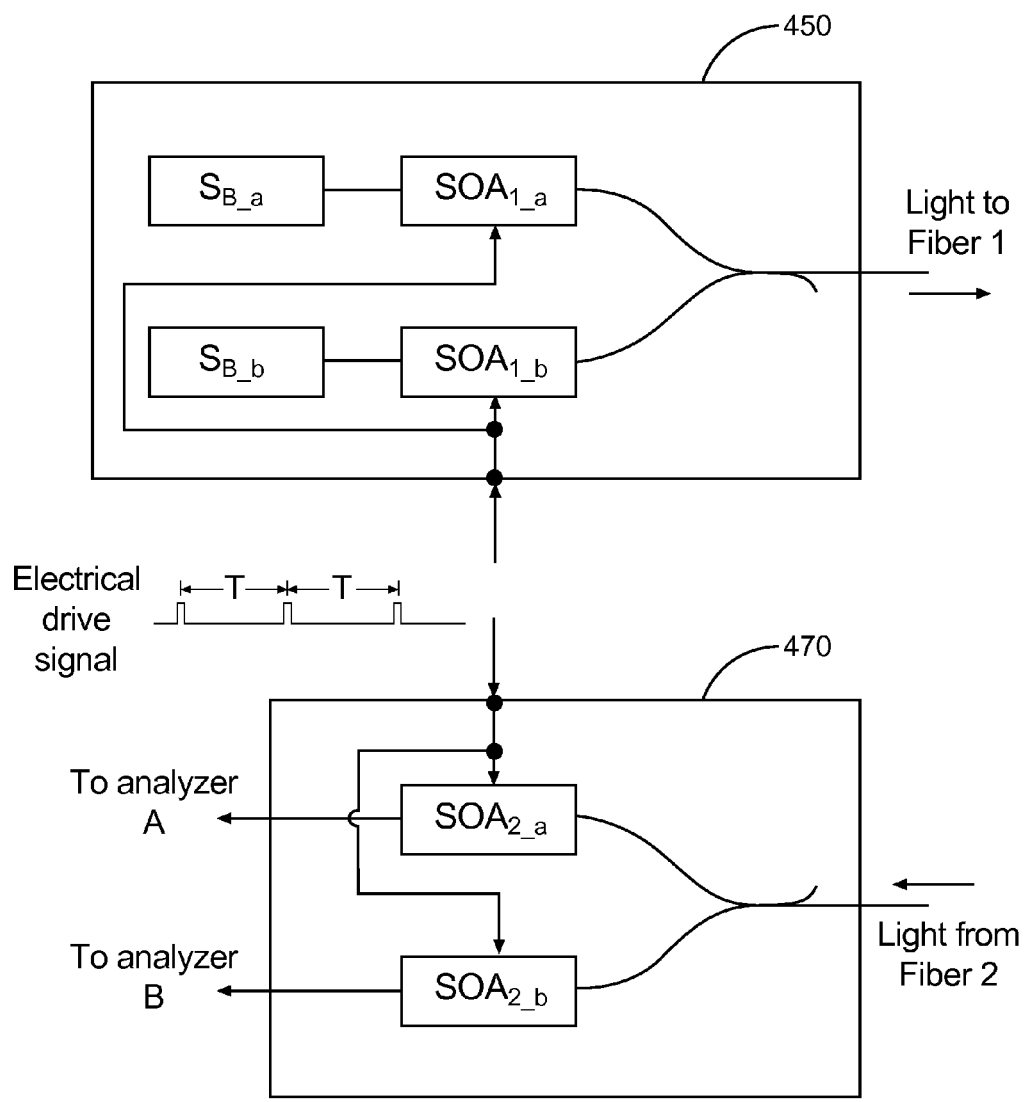
FIG. 4 shows a block diagram of an example configuration in an optical system used to expand the spectral width covered by optical amplifiers, in accordance with various embodiments.

In some cases, it may be desirable to operate the system over a larger spectral width than can be achieved by a single SOA. For instance, each sensor assembly may consist of several sensors that are wavelength-division multiplexed, but, for the wavelength range required, the spectral width of a single SOA may be insufficient. FIG. 4 shows a block diagram of an embodiment of an example configuration in an optical system used to expand the spectral width covered by the optical amplifiers. This configuration addresses the abovementioned problem by combining, on the launch side, several source/SOA pairs and by combining the light from these pairs on the launch side. Fiber 1 and fiber 2 are configured with SAs in a manner similar or identical to systems discussed herein. The electrical signal is fed to both $SOA_{1\_a}$ and $SOA_{1\_b}$ present in this launch assembly 450 so that they are in sync. Because the light from source $S_{B\_a}$ is uncorrelated to that of source $S_{B\_b}$, the two do not interfere and the assembly operates as for the case of FIG. 1. On the receive side, with the $SOA_{2\_a}$ and $SOA_{2\_b}$ also connected to same external electrical pulse signal, the light output is fed to two distinct analyzers so as to not create a stray Mach-Zehnder interferometer in the receive system. However, there may be applications where such stray interferometers will not be a problem, but the illustrated approach can provide enhancements from a noise-reduction perspective.

Figure 5:
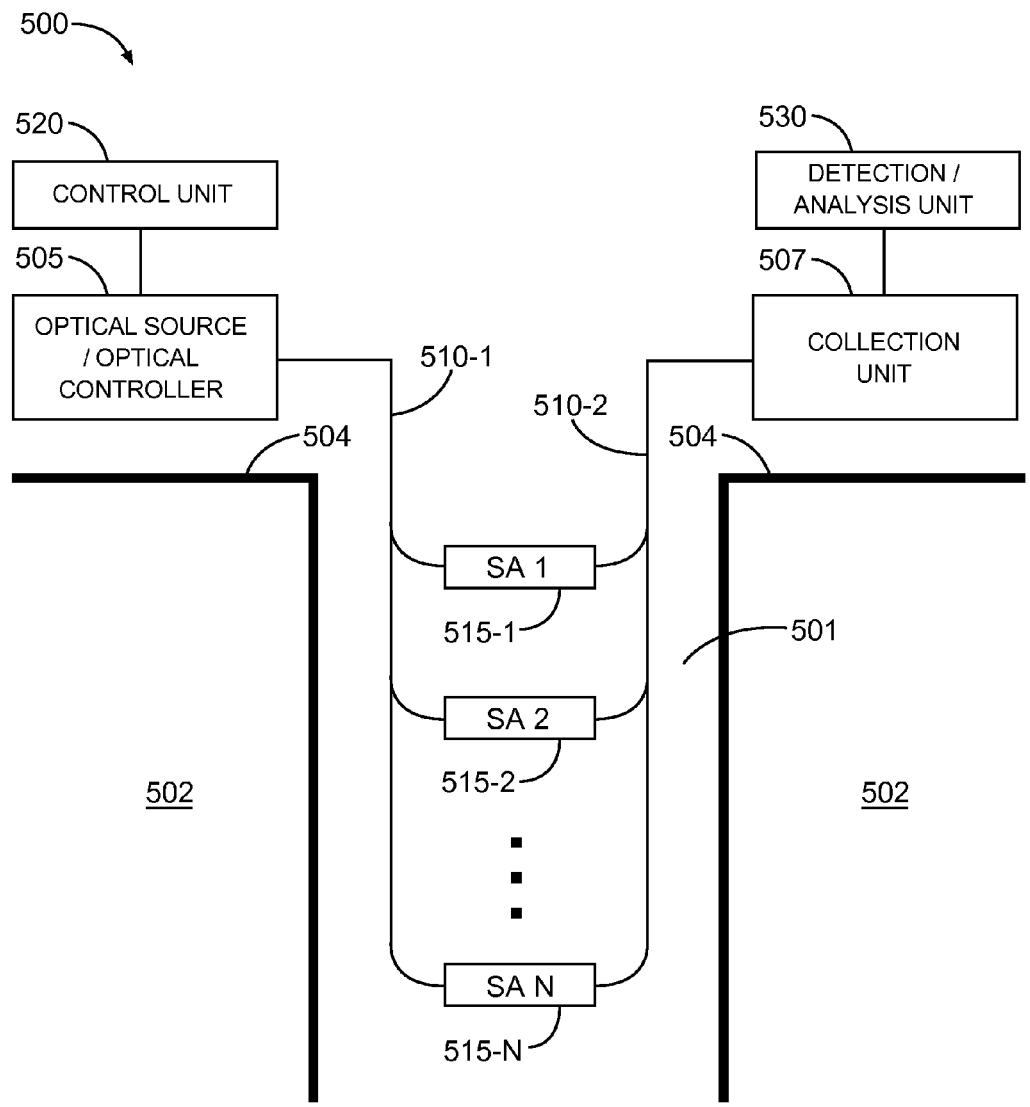
FIG. 5 shows a block diagram of an example system arranged to make measurements in a wellbore, in accordance with various embodiments.

FIG. 5 shows a block diagram of an embodiment of an example system 500 arranged to make measurements in a wellbore 501. System 500 can include a control unit 520, an optical source/SOA unit 505, a collection SOA unit 507, an optical fiber 510-1, an optical fiber 510-2, a detection/analysis unit 530, and a plurality of SAs 515-1, 515-2 . . . 515-N. These components can be structured to perform similar to or identical to components of various systems discussed herein. As shown in FIG. 5, the system 500 can be arranged with the optical fibers 510-1 and 510-2 disposed in wellbore 501 in formation 502 with the control unit 520, the optical source/SOA unit 505, the collection SOA unit 507, and the detection/analysis unit 530 on surface 504. Alternatively, various components of the control unit 520, the optical source/SOA unit 505, the collection SOA unit 507, and the detection/analysis unit 530 may be located downhole. The plurality of SAs 515-1, 515-2 . . . 515-N couples the optical fiber 510-1 to the optical fiber 510-2. Each SA of the plurality of SAs 515-1, 515-2 . . . 515-N can include a number of sensors. The optical fibers 510-1 and 510-2 may be fiber segments connected by an optical segment after SA 515-N. With the control unit 520 controlling the timing of the optical source/SOA unit 505 and the collection SOA unit 507, the plurality of SAs 515-1, 515-2 . . . 515-N can be interrogated in a TDM manner With multiple sensors in one or more of the SAs 515-1, 515-2 . . . 515-N, the interrogation can include WDM processing.

In various embodiments, a system can comprise: a first optical amplifier arranged to receive a control signal such that, based on the control signal, the first optical amplifier operatively gates, on and off, light input to the first optical fiber, the first optical amplifier being a semiconductor optical amplifier; a first optical fiber coupled to the first optical amplifier to receive an optical output from the first optical amplifier; a second optical fiber; a plurality of sensor assemblies, each sensor assembly coupled from the first optical fiber to the second optical fiber such that each sensor assembly is coupled to the first optical fiber at a different distance from the first optical amplifier than the other sensor assemblies of the plurality of sensor assemblies; a second optical amplifier arranged to receive the control signal such that, based on the control signal, the second optical amplifier operatively gates, on and off, light input to the second optical amplifier from the second optical fiber, the second optical amplifier being a semiconductor optical amplifier; and a control unit arranged to generate the control signal to the first optical amplifier and to the second optical amplifier, the control signal correlated to the distances of the sensor assemblies from the first optical amplifier such that only a signal from one selected sensor assembly of the plurality of sensor assemblies is output from the second optical amplifier.

Embodiments of the system can include an optical source operatively coupled to the first optical amplifier, where the optical source is a broadband optical source. The plurality of sensor assemblies can include one or more of a microelectromechanical system (MEMS)-based Fabry-Perot sensor, a long-period Bragg grating sensor, an extrinsic Fabry-Perot interferometer sensor, or an integrated computational element sensor. In various embodiments, each sensor assembly of the plurality of sensor assemblies can include a plurality of sensors structured such that each sensor of a respective sensor assembly is separated in wavelength domain.

Embodiments of the system can include an optical source operatively coupled to the first optical amplifier, where the optical source is a coherent light source, or the combination of several coherent light sources (for a "wavelength comb"). The coherent light source can include one or several semiconductor lasers. In various embodiments, each sensor assembly of the plurality of sensor assemblies can include a Mach-Zehner interferometer.

In various embodiments in addition to first and second optical amplifiers as discussed above, a system can include: a third optical amplifier arranged to receive the control signal such that, based on the control signal, the third optical amplifier operatively gates, on and off, light input to the third optical amplifier, where optical output of the third optical amplifier is coupled to the first optical fiber; and a fourth optical amplifier arranged to receive the control signal such that, based on the control signal, the fourth optical amplifier operatively gates, on and off, light input to the fourth optical amplifier from the second optical fiber. The third optical amplifier and the fourth optical amplifier can be realized by semiconductor optical amplifiers. The first optical amplifier and the third optical amplifier can be coupled to respective optical sources, where the respective optical sources are uncorrelated with respect to each other. Such a system can include a first analyzer coupled to the second optical amplifier to receive optical output from the second optical amplifier; and a second analyzer coupled to the fourth optical amplifier to receive optical output from the fourth optical amplifier.

In various embodiments, systems, having a plurality of sensor assemblies that can be operated in a multiplexed manner, can include the control unit structured to generate the control signal as a pulse train with each pulse separated from a next pulse by a set time, the set time adjustable by the control unit. The plurality of sensor assemblies can include: a furthest sensor assembly having a total optical path with respect to a path from the first optical amplifier to the furthest sensor assembly and from the furthest sensor assembly to the second optical amplifier; and a closest sensor assembly having a total optical path with respect to a path from the first optical amplifier to the closest sensor assembly and from the closest sensor assembly to the second optical amplifier such that the total optical path corresponding to the furthest sensor is not longer than twice the total optical path of the closest sensor assembly. The set time can be adjustable to interrogate each sensor assembly of the plurality of sensor assemblies, each sensor assembly corresponding to a different set time. In various embodiments, systems discussed herein can include: an optical isolator disposed between the first optical amplifier and the first optical fiber; and an optical isolator disposed between the second optical fiber and the second optical amplifier. In various embodiments, a system can be arranged wherein the first optical fiber, the second optical fiber, and the plurality of sensor assemblies are structured to be operable in a wellbore.

Figure 6:
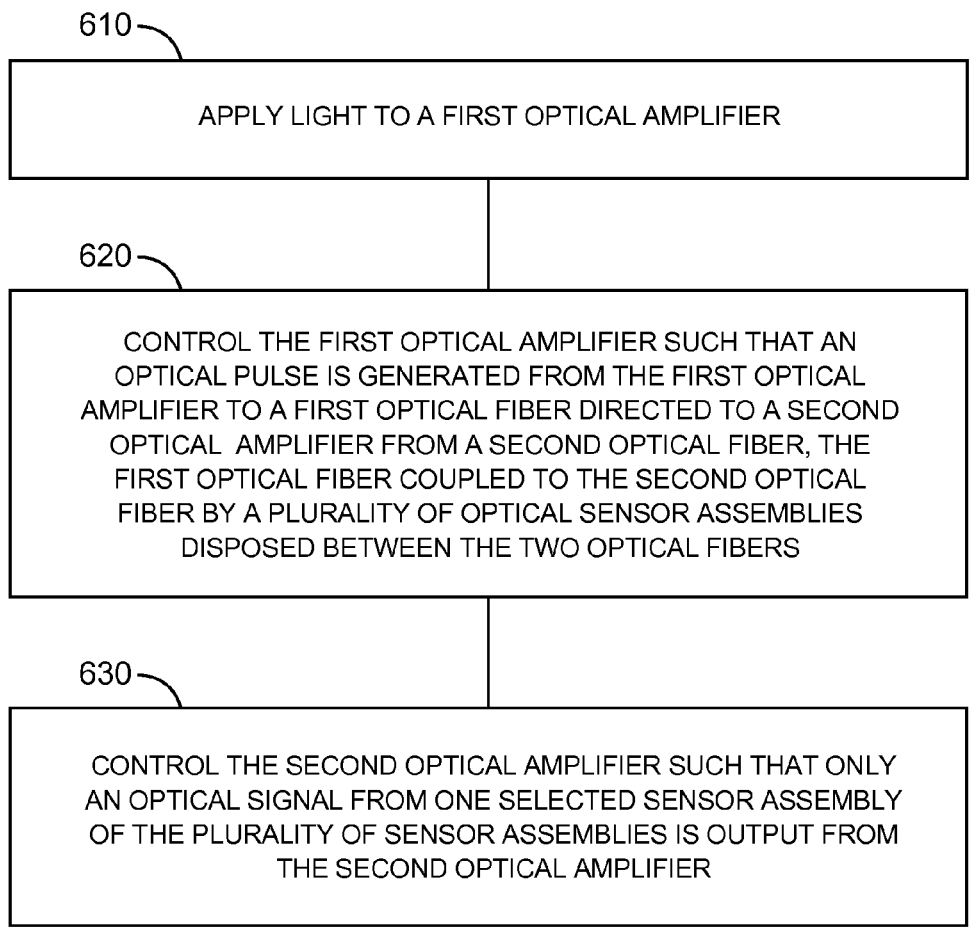
FIG. 6 shows features of an example method of interrogating transmissive optical sensors, in accordance with various embodiments.

FIG. 6 shows features of an embodiment of an example method to provide multiplexing of transmissive optical sensors. At 610, light is applied to a first optical amplifier. The first optical amplifier can be realized by a semiconductor amplifier. At 620, the first optical amplifier is controlled such that an optical pulse is generated from the first optical amplifier to a first optical fiber directed to a second optical amplifier from a second optical fiber, where the first optical fiber is coupled to the second optical fiber by a plurality of optical sensor assemblies disposed between the two optical fibers. The optical pulse can be correlated to the applied light. The sensor assemblies are disposed at different distances from the first optical amplifier. The second optical amplifier can be realized by a semiconductor optical amplifier, At 630, the second optical amplifier is controlled such that only an optical signal from one selected sensor assembly of the plurality of sensor assemblies is output from the second optical amplifier. Controlling the first optical amplifier and controlling the second optical amplifier can include generating an electrical drive signal to both the first optical amplifier and the second optical amplifier such that the first optical amplifier and the second optical amplifier gate respective input light, on and off in sync. The electrical drive signal can be a pulse train, each pulse separated from a next pulse of the pulse train by a set time, the set time adjustable by a controller applying the electrical drive signal. Methods to provide multiplexing of transmissive optical sensors can include selecting the set time such that optical output from the second optical fiber corresponds to only the selected sensor assembly based on the set time. Methods to provide multiplexing of transmissive optical sensors can include sequencing through a plurality of set times providing a plurality of optical outputs from the second optical fiber such that each optical output of the plurality of optical outputs corresponds to only a selected sensor assembly based on a respective set time for each sensor assembly of the plurality of sensor assemblies. The plurality of optical outputs can be received at a receiver system providing a time multiplexed sensor signal.

In various methods to provide multiplexing of transmissive optical sensors, applying the light can include applying light from a broadband optical source. Such methods can include generating a wavelength division multiplexed sensor signal from a sensor assembly of the plurality of sensor assemblies using a plurality of sensors arranged in the sensor assembly.

In various methods to provide multiplexing of transmissive optical sensors, applying the light can include applying light from a coherent light source. The coherent light source can include a semiconductor laser. Each sensor assembly of the plurality of sensor assemblies can include a Mach-Zehner interferometer.

Methods to provide multiplexing of transmissive optical sensors can include applying optical input to a third optical amplifier such that the optical input applied to the third optical amplifier is uncorrelated with the light applied to the first optical amplifier, optical output from the third optical amplifier coupled to the first optical fiber, the third optical amplifier being a semiconductor optical amplifier; gating the third optical amplifier on and off using the electrical drive signal in sync with gating the first optical amplifier; and gating a fourth optical amplifier on and off using the electrical drive signal in sync with gating the second optical amplifier, the fourth optical amplifier coupled to the second optical fiber. Such methods can include directing optical output from the second optical amplifier to a first analyzer; and directing optical output from the fourth optical amplifier to a second analyzer, the first analyzer being different from the second analyzer.

Methods to provide multiplexing of transmissive optical sensors, discussed herein, can include determining parameters at different locations in a wellbore from the optical output from the second optical fiber, the first and second optical fibers disposed in the wellbore. Embodiments can include permutations of features from among the different systems and methods taught herein.

In various embodiments, a machine-readable storage device, such as a computer-readable storage device, has machine-executable instructions, which when executed by a controller, such as a processor, cause a measurement system to operate downhole in a well using optical controllers to direct optical probe signals through a series of sensor assemblies in a TDM process, where the series of sensor assemblies couple a first optical fiber to a second optical fiber. The first optical fiber and the second optical fiber may be fiber segments of a common optical fiber. The instructions provide a mechanism to control or simulate the measurement system to operate in a manner similar to or identical to systems associated with FIGS. 1-7. The machine-readable storage device is not limited to any one type of device. Further, a machine-readable storage device, herein, is a physical device that stores data represented by physical structure within the device. Machine-readable storage devices may include, but are not limited to, solid-state memories, optical devices, and magnetic devices. Examples of machine-readable storage devices include, but are not limited to, read only memory (ROM), random access memory (RAM), a magnetic disk storage device, an optical storage device, a flash memory, and other electronic, magnetic, and/or optical memory-like devices.

Figure 7:
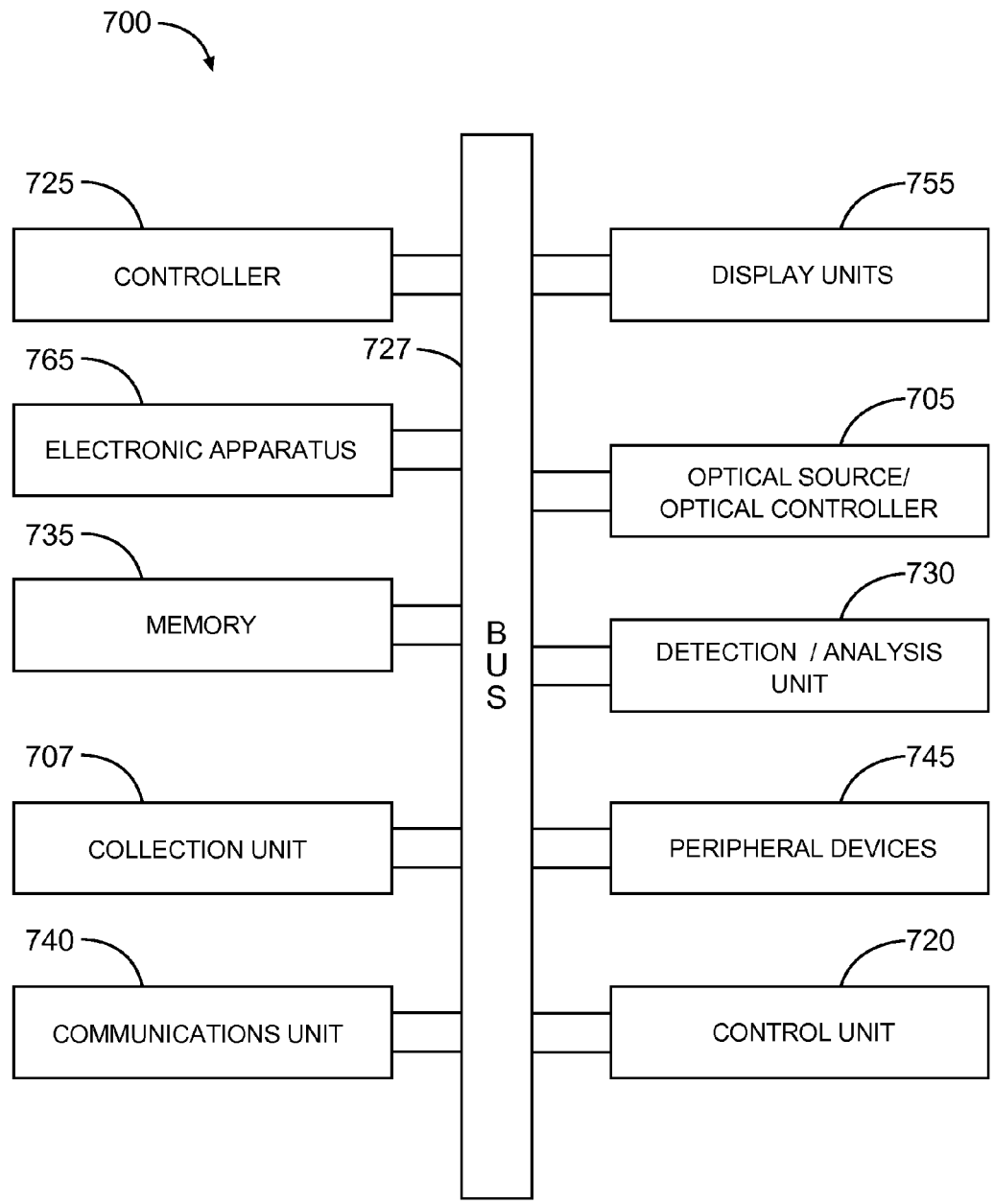
FIG. 7 depicts a block diagram of an example system that can use two optical fibers with a number of optical sensor assemblies coupling the two optical fibers to each other, in accordance with various embodiments.

FIG. 7 depicts a block diagram of an example embodiment of a system 700 that can use two optical fibers with a plurality of optical SAs coupling the two optical fiber segments to each other. The two optical fibers may be two fiber segments of a common optical fiber. The two optical fibers and the plurality of optical SAs can be structured to operate downhole in a well. An optical source and an optical controller 705 can be used to selectively and individually interrogate the plurality of optical SAs. The optical controller can be realized as an optical amplifier. The system 700 can be structured to operate the optical source/optical controller 705, the collection unit 707, the detection/analysis unit 730, and the control unit 720 with respect to the optical fibers in accordance with the teachings herein. The system 700 can also include a controller 725, a memory 735, an electronic apparatus 765, and a communications unit 740.

The controller 725, the memory 735, and the communications unit 740 may be arranged to operate as a processing unit to control operation of the optical source/optical controller 705, the collection unit 707, the detection/analysis unit 730, and the control unit 720, in a manner similar or identical to the procedures discussed herein. The controller 725 and the memory 735 can operate to control activation of the optical source/optical controller 705 and collection of signals from the collection unit 707. The system 700 can be structured to function in a manner similar to or identical to structures associated with FIGS. 1-6.

The system 700 can also include a bus 727, where the bus 727 provides electrical conductivity among the components of the system 700. The bus 727 can include an address bus, a data bus, and a control bus, each independently structured or in an integrated format. The bus 727 can be realized using a number of different communication mediums that allows for the distribution of components of system 700. The bus 727 can be arranged to provide a communication medium using traditional downhole communications techniques. The communications unit 740 can include downhole communications operable with bus 727. Such downhole communications can include a telemetry system. Use of bus 727 can be regulated by controller 725.

In various embodiments, the peripheral devices 745 can include additional storage memory and/or other control devices that may operate in conjunction with the controller 725 and/or the memory 735. In an embodiment, the controller 725 can be realized as a processor or a group of processors that may operate independently depending on an assigned function. The peripheral devices 745 can be arranged with one or more displays 755 as a distributed component on the surface, where the displays 755 can be used with instructions stored in the memory 735 to implement a user interface to monitor the operation of components distributed within the system 700. The user interface can be used to input parameter values to operate the system 700.

In various embodiments, systems and methods can be arranged and performed, as taught herein, to use transmissive optical sensors coupled between two optical fiber using one or more optical controllers such as OAs. The OAs may be SOAs. Using two SOAs allows for an arrangement in which a narrow linewidth light source can be added in front of the launch SOA of the two SOAs to interrogate Mach-Zehnder style interferometric sensors.

The technique of arranging SAs with SOAs, as taught herein, can combine both WDM and TDM to increase the number of sensors that can be used. Sensors that are structured for WDM can be in close optical proximity to each other. Processing of the light on the receiver end can take place using any standard approach (as if no TDM was used), because as long as the time, T, between pulses is maintained at a set value, the system beyond the SOA on the receive end of the system only sees the light from the one sensor assembly being interrogated. In embodiments using semiconductor devices, such as an SOA, the techniques, taught herein, can be implemented in compact electronics, because it is only based on semiconductor devices. Because light travels in one direction only, systems can employ optical isolators to help in the performance of the system. The technique of arranging SAs with SOAs, as taught herein, may also be used to interrogate several ICE devices (ICE multiplexing) using TDM. A seismic sensing approach can use transmittive MEMS-bases sensors that can be interrogated by the techniques taught herein. Apparatus and techniques, as taught herein, may permit a low cost means to interrogate a number of sensors and provide a multiplexing approach that provides a convenient way to interrogate sensors, such as, but not limited to, a number of MEMS-based EM sensors. The complexity and cost may be reduced relative to other techniques, since, in some embodiments, the use of high speed electronics may be directed to the electrical drive circuitry that regulates one or more optical controllers that provide optical probe signals and optical measurement signals.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system comprising:
a first optical amplifier arranged to receive a control signal such that, based on the control signal, the first optical amplifier operatively gates, on and off, light input to the first optical amplifier, the first optical amplifier being a semiconductor optical amplifier;
a first optical fiber coupled to the first optical amplifier to receive an optical output from the first optical amplifier;
a second optical fiber;
a plurality of sensor assemblies, each sensor assembly coupled from the first optical fiber to the second optical fiber such that each sensor assembly is coupled to the first optical fiber at a different distance from the first optical amplifier than the other sensor assemblies of the plurality of sensor assemblies;
a second optical amplifier arranged to receive the control signal such that, based on the control signal, the second optical amplifier operatively gates, on and off, light input to the second optical amplifier from the second optical fiber, the second optical amplifier being a semiconductor optical amplifier; and
a control unit arranged to generate the control signal to the first optical amplifier and to the second optical amplifier, the control signal correlated to the distances of the sensor assemblies from the first optical amplifier such that only a signal from one selected sensor assembly of the plurality of sensor assemblies is output from the second optical amplifier.

2. The system of claim 1, wherein the system includes an optical source operatively coupled to the first optical amplifier, the optical source being a broadband optical source.

3. The system of claim 2, wherein the plurality of sensor assemblies includes one or more of a microelectromechanical system (MEMS)-based Fabry-Perot sensor, a long-period Bragg grating sensor, an extrinsic Fabry-Perot interferometer sensor, or an integrated computational element sensor.

4. The system of claim 1, wherein each sensor assembly of the plurality of sensor assemblies includes a plurality of sensors structured such that each sensor of a respective sensor assembly is separated in the wavelength domain.

5. The system of claim 1, wherein the system includes an optical source operatively coupled to the first optical amplifier, the optical source being a coherent light source, or a combination of several coherent light sources.

6. The system of claim 5, wherein the coherent light source includes a semiconductor laser or several semiconductor lasers.

7. The system of claim 5, wherein each sensor assembly of the plurality of sensor assemblies includes a Mach-Zehner interferometer.

8. The system of claim 1, wherein the system includes:
a third optical amplifier arranged to receive the control signal such that, based on the control signal, the third optical amplifier operatively gates, on and off, light input to the third optical amplifier, optical output of the third optical amplifier coupled to the first optical fiber, the third optical amplifier being a semiconductor optical amplifier; and
a fourth optical amplifier arranged to receive the control signal such that, based on the control signal, the fourth optical amplifier operatively gates, on and off, light input to the fourth optical amplifier from the second optical fiber, the fourth optical amplifier being a semiconductor optical amplifier.

9. The system of claim 8, wherein the first optical amplifier and the third optical amplifier are coupled to respective optical sources, the respective optical sources being uncorrelated with respect to each other.

10. The system of claim 9, wherein the system includes:
a first analyzer coupled to the second optical amplifier to receive optical output from the second optical amplifier; and
a second analyzer coupled to the fourth optical amplifier to receive optical output from the fourth optical amplifier.

11. The system of claim 1, wherein the control unit is structured to generate the control signal as a pulse train with each pulse separated from a next pulse by a set time, the set time adjustable by the control unit.

12. The system of claim 11, wherein the plurality of sensor assemblies includes:
a furthest sensor assembly having a total optical path with respect to a path from the first optical amplifier to the furthest sensor assembly and from the furthest sensor assembly to the second optical amplifier; and
a closest sensor assembly having a total optical path with respect to a path from the first optical amplifier to the closest sensor assembly and from the closest sensor assembly to the second optical amplifier such that the total optical path corresponding to the furthest sensor is not longer than twice the total optical path of the closest sensor assembly.

13. The system of claim 12, wherein the set time is adjustable to interrogate each sensor assembly of the plurality of sensor assemblies, each sensor assembly corresponding to a different set time.

14. The system of claim 13, wherein the system includes:
an optical isolator disposed between the first optical amplifier and the first optical fiber; and
an optical isolator disposed between the second optical fiber and the second optical amplifier.

15. The system of claim 13, wherein the first optical fiber, the second optical fiber, and the plurality of sensor assemblies are structured to be operable in a wellbore.

16. A method comprising:
applying light to a first optical amplifier, the first optical amplifier being a semiconductor amplifier;
controlling the first optical amplifier such that an optical pulse is generated from the first optical amplifier to a first optical fiber directed to a second optical amplifier from a second optical fiber, the first optical fiber coupled to the second optical fiber by a plurality of optical sensor assemblies disposed between the two optical fibers, the sensor assemblies disposed at different distances from the first optical amplifier, the second optical amplifier being a semiconductor optical amplifier, the optical pulse being correlated to the applied light;
controlling the second optical amplifier such that only an optical signal from one selected sensor assembly of the plurality of sensor assemblies is output from the second optical amplifier.

17. The method of claim 16, wherein controlling the first optical amplifier and controlling the second optical amplifier includes generating an electrical drive signal to both the first optical amplifier and the second optical amplifier such that the first optical amplifier and the second optical amplifier gate respective input light, on and off in sync.

18. The method of claim 17, wherein the electrical drive signal is a pulse train, each pulse separated from a next pulse of the pulse train by a set time, the set time adjustable by a controller applying the electrical drive signal.

19. The method of claim 18, wherein the method includes selecting the set time such that optical output from the second optical fiber corresponds to only the selected sensor assembly based on the set time.

20. The method of claim 18, wherein the method includes sequencing through a plurality of set times providing a plurality of optical outputs from the second optical fiber such that each optical output of the plurality of optical outputs corresponds to only a selected sensor assembly based on a respective set time for each sensor assembly of the plurality of sensor assemblies.

21. The method of claim 20, wherein the plurality of optical outputs is received at a receiver system providing a time multiplexed sensor signal.

22. The method of claim 16, wherein applying the light includes applying light from a broadband optical source.

23. The method of claim 22, wherein the method includes generating a wavelength division multiplexed sensor signal from a sensor assembly of the plurality of sensor assemblies using a plurality of sensors arranged in the sensor assembly.

24. The method of claim 16, wherein applying the light includes applying light from a coherent light source.

25. The method of claim 24, wherein the coherent light source includes a semiconductor laser.

26. The method of claim 24, wherein each sensor assembly of the plurality of sensor assemblies includes a Mach-Zehner interferometer.

27. The method of claim 17, wherein the method includes:
applying optical input to a third optical amplifier such that the optical input applied to the third optical amplifier is uncorrelated with the light applied to the first optical amplifier, optical output from the third optical amplifier coupled to the first optical fiber, the third optical amplifier being a semiconductor optical amplifier;

gating the third optical amplifier on and off using the electrical drive signal in sync with gating the first optical amplifier; and gating a fourth optical amplifier on and off using the electrical drive signal in sync with gating the second optical amplifier, the fourth optical amplifier coupled to the second optical fiber.

28. The method of claim 27, wherein the method includes:

directing optical output from the second optical amplifier to a first analyzer; and directing optical output from the fourth optical amplifier to a second analyzer, the first analyzer being different from the second analyzer.

29. The method of claim 16, wherein the method includes determining parameters at different locations in a wellbore from the optical output from the second optical fiber, the first and second optical fibers disposed in the wellbore.

* * * * *